Dec. 19, 1961 W. PECHY 3,013,590

LEAD-WIRE ORIENTING AND STRAIGHTENING APPARATUS

Filed Oct. 9, 1958 6 Sheets-Sheet 1

Inventor:
William Pechy,
by [signature]
Attorney

Dec. 19, 1961 W. PECHY 3,013,590

LEAD-WIRE ORIENTING AND STRAIGHTENING APPARATUS

Filed Oct. 9, 1958 6 Sheets-Sheet 2

Inventor:
William Pechy,
by [signature]
Attorney

LEAD-WIRE ORIENTING AND STRAIGHTENING APPARATUS

Filed Oct. 9, 1958 6 Sheets-Sheet 3

Inventor:
William Pechy,
by R J Leek Jr
Attorney

Dec. 19, 1961 W. PECHY 3,013,590

LEAD-WIRE ORIENTING AND STRAIGHTENING APPARATUS

Filed Oct. 9, 1958 6 Sheets-Sheet 4

Inventor:
William Pechy,
by R. J. Leek Jr.
Attorney

LEAD-WIRE ORIENTING AND STRAIGHTENING APPARATUS

Filed Oct. 9, 1958 6 Sheets-Sheet 5

Inventor:
William Pechy,
by [signature]
Attorney

Inventor:
William Pechy,
by [signature]
Attorney

United States Patent Office 3,013,590
Patented Dec. 19, 1961

3,013,590
LEAD-WIRE ORIENTING AND STRAIGHTENING APPARATUS

William Pechy, Manasquan, N.J., assignor to Westinghouse Electric Corporation, East Pittsburgh, Pa., a corporation of Pennsylvania Filed Oct. 9, 1958, Ser. No. 766,261
7 Claims. (Cl. 140—147)

The present invention relates to the manufacture of electrical devices having lead wires, and relates more particularly to apparatus for orienting the lead wires of an electrical device, such as a fluorescent lamp, preparatory for the threading of the oriented lead wires through a base.

Heretofore, sealed fluorescent lamps have been exhausted on a conventional exhaust machine of the type shown in U.S. Patent No. 2,533,712, issued December 12, 1950 to J. M. Campbell. During the final stages of the exhaust operation the two lead wires extending from the end-seal portion of the fluorescent lamp (having the exhaust tubulation) are draped downwardly along opposite sides of the lamp to clear the exhaust tubulation for the tip-off operation. Such lead wires are out of position for the following operation where the lead wires are threaded into a base on a threading conveyor of the type shown in U.S. Patent No. 2,720,690, issued October 18, 1955 to D. Mullan et al. At one station of this threading conveyor the lead wires are lifted up from the downwardly-draped position to a more nearly upright position by a lifting or bending device. At the next station the lead wires are finally straightened by a straightening device preparatory for the threading operation at a succeeding station. The lamp is then inverted and the procedure repeated on the other end of the lamp, whereupon the threaded fluorescent lamp is transferred to a basing machine of the type shown in U.S. Patent No. 2,439,884 issued April 20, 1948 to J. M. Campbell.

While the lead-wire straightening device of the above-mentioned Mullan et al. patent is satisfactory, it has been found that the lead-wire straightening jaws thereof which are adapted (in order to grasp the lead wires) to move along the top of the end-seal portion of the fluorescent lamp often fail to engage lead wires which have been missed or have not been lifted to the proper position by the preceeding lifting device. Further, an adjustment of the straightening jaws to move the latter closer to the top of the end-seal portion of the fluorescent lamp causes such jaws to often engage the tip-off on the exhaust tubulation, thereby causing breakage of the latter.

In addition, after the lead wires have been straightened, and released by the straightening jaws, they spring back away from the desired straight position, parallel to the longitudinal axis of the fluorescent lamp, thereby making the threading operation at the threading station more difficult.

The successful operation of the threading conveyor requires a push-down device disposed at a preliminary work station, which push-down device engages the top of the lamp to position the top thereof in a predetermined horizontal plane, thereby predetermining the position of the top of the fluorescent lamp with respect to the straightening jaws and for the subsequent threading operation. However, when the straightening jaws grip the lead wires during the straightening operation, the pull of the straightening jaws on the lead wires occasionally displaces the lamp from this predetermined position.

It is the general object of the present invention to avoid and overcome the foregoing and other difficulties of and objections to prior art practices by the provision of an improved lead-wire orienting apparatus for a threading conveyor, which apparatus straightens, positions and sets the straightened, positioned lead wires of an electrical device in a single operation performed at one work station.

Another object of the present invention is a lead-wire orienting apparatus which straightens and positions the lead wires of an electrical device and prevents spring-back of the straightened and properly positioned lead wires by the work hardening thereof.

A further object of the present invention is a lead-wire orienting apparatus which eliminates the conventional push-down device on the threading conveyor for positioning the electrical device in a predetermined position and which itself positions and maintains the device in the desired position during the lead-wire straightening, positioning and setting operation.

Still another object of the present invention is a lead-wire orienting apparatus for the manufacture of electric lamps and the like, which eliminates breakage of the tipped-off exhaust tubulation and the seal during the lead-wire straightening, positioning and setting operation.

The aforesaid objects of the present invention and other objects which will become apparent as the description proceeds are achieved by providing a lead-wire orienting apparatus which automatically straightens, positions and sets by work hardening the straightened, positioned lead wires of an electrical device, such as an electric lamp. When a lamp arrives at the lead-wire orienting station of the threading conveyor a hollow anvil, an aligned lamp holder within the anvil, and a pair of open lead-wire orienting jaws (shaped generally to conform with the outer surface of the anvil) are automatically moved downwardly towards the lamp until the lamp holder with the anvil thereon contacts the lamp and moves it slightly downwardly. Thereafter, since the downward movement of the anvil and the lamp holder is discontinued the lamp remains stationary. The open orienting jaws continue their downward movement until they are below the lower ends of the lead wires, whereupon the orienting jaws then close around the lamp, and are moved upwardly to move the lead wires upwardly over the end-seal portion of the lamp and alongside the anvil. Bevels on the ends of the orienting jaws prevent the latter from closing around the end-seal portion at the top of the lamp and damaging the seal. The orienting jaws are then closed around the anvil with the lead wires between the jaws and the anvil, and the jaws and anvil are moved upwardly together to simultaneously straighten, position and cold work the lead wires thereby hardening and setting them in a straightened position parallel to the longitudinal axis of the lamp. The lamp holder remains in contact with the top of the lamp during such upward movement of the orienting jaws and anvil to prevent the pull of the anvil and jaws on the lead wires from raising the lamp from the predetermined position.

For a better understanding of the present invention reference should be had to the accompanying drawings, wherein like numerals of reference indicate similar parts throughout the several views and wherein.

Although the principles of the present invention are broadly applicable to the orienting of the lead wires of any electrical device, the present invention is particularly adapted for use in conjunction with the straightening, positioning and setting of the straightened lead wires of a fluorescent lamp and hence it has so been illustrated and will be so described.

Figure 1:
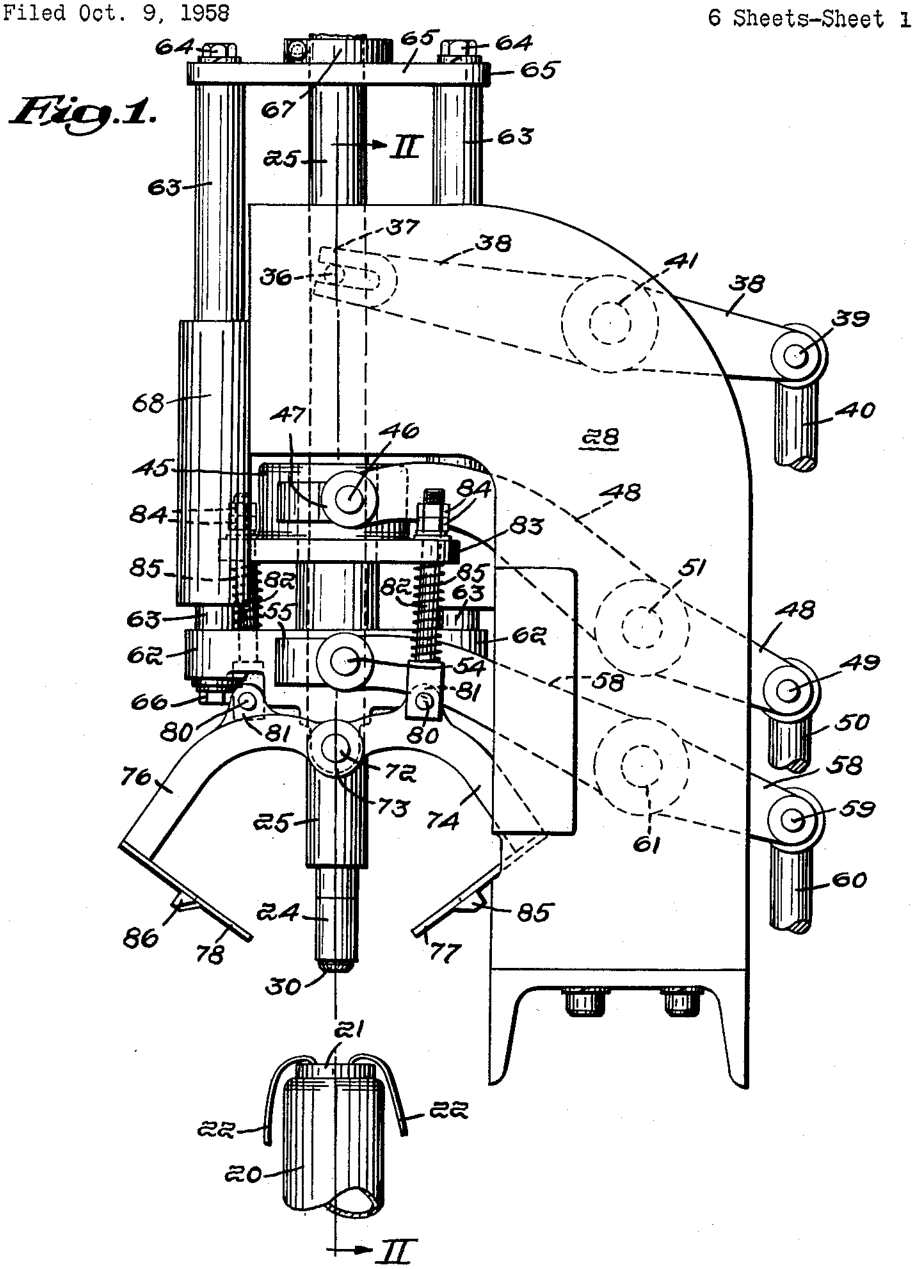
FIG. 1 is a fragmentary front-elevational view of the lead-wire orienting apparatus of the present invention disposed at a lead-wire orienting station of a conventional threading conveyor embodying this apparatus, the apparatus being shown in its position at the start of the lead-wire orienting operation.
Figure 4:
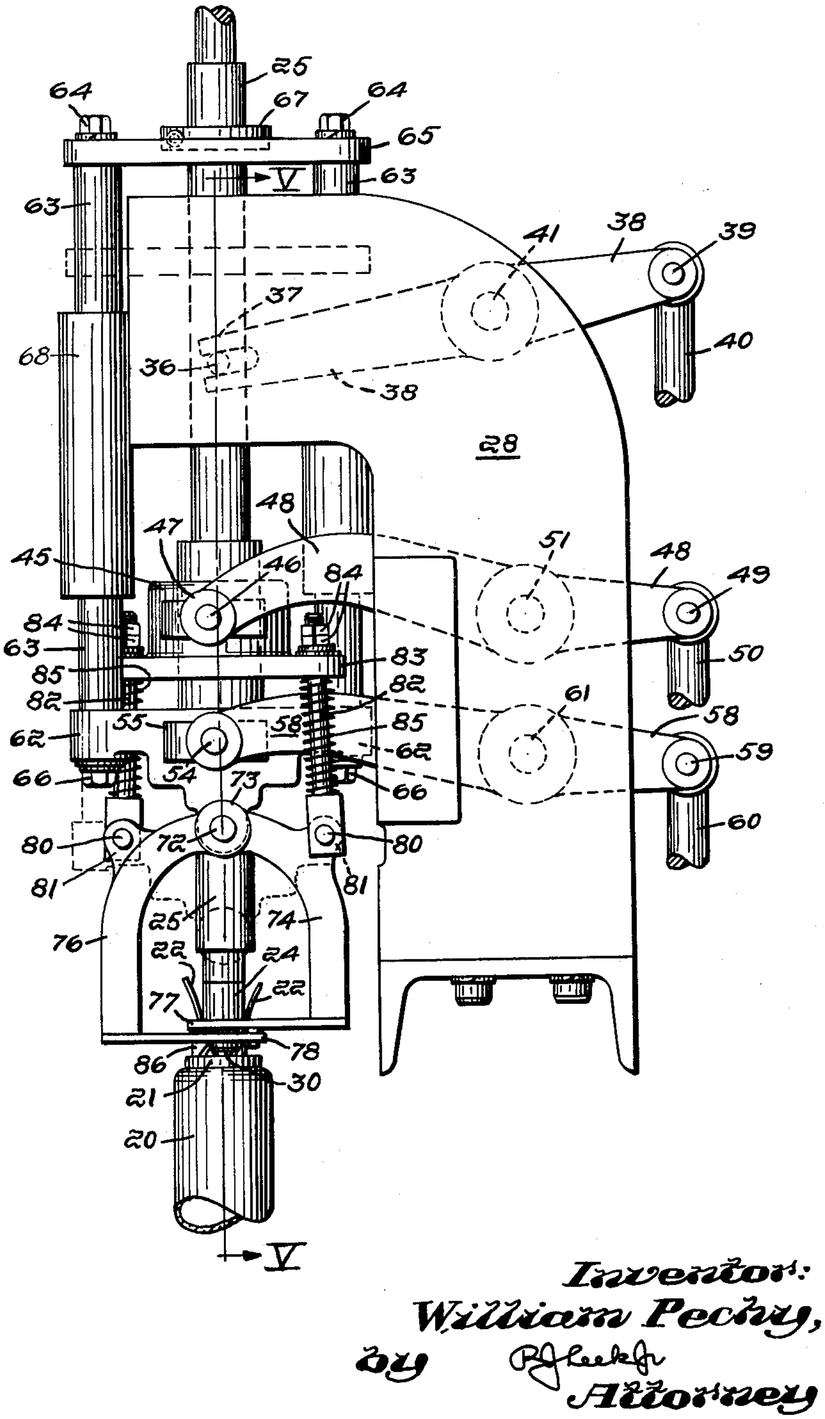
FIG. 4 is a view corresponding to FIG. 1, but showing the orienting jaws of the lead-wire orienting apparatus closed about the anvil with the lead wires secured between the jaws and anvil.

With specific reference to the form of the present invention illustrated in the drawings, and refererring particularly to FIGS. 1 and 4, a fluorescent lamp 20 (only the upper portion of which is shown in such figures) is vertically supported by a head (not shown) of a conventional threading conveyor such as the type shown in the above-mentioned U.S. Patent No. 2,720,690. The lamp 20, shown at the lead-wire orienting station of the threading conveyor adjacent the lead-wire orienting apparatus of the present invention, has a seal 21 at its top and lead wires 22 which were previously draped downwardly along opposite sides of the lamp to facilitate the now accomplished tipping-off of the exhaust tubulation of the lamp 20.

Figure 7:
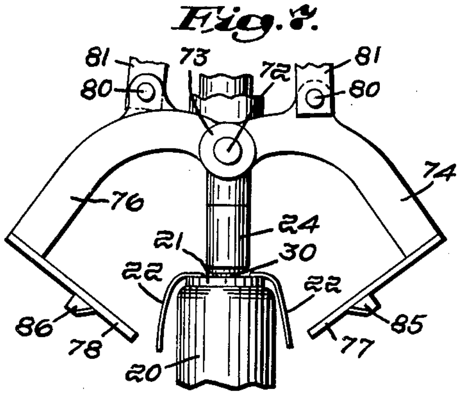
FIGS. 7 through 12 show successive positions of the lamp holder, anvil and orienting jaws from the positions shown in FIGS. 1 and 4 to the end of the operation.
Figure 8:
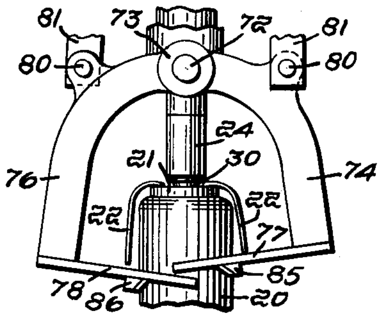
Figure 9:
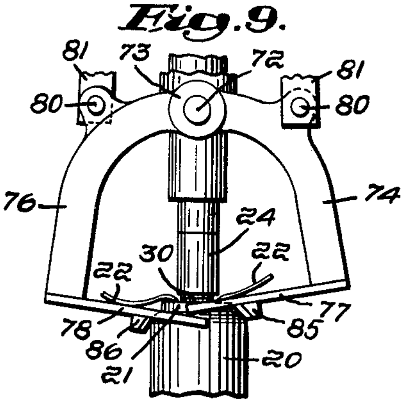
Figure 10:
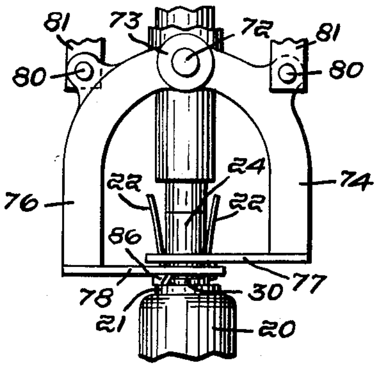

Referring to FIG. 1 this lead-wire orienting apparatus has a hollow anvil 24, a coaxially aligned lamp holder 30 within the anvil 24 and a pair of normally open lead-wire orienting jaws 77 and 78, all of which move downwardly together from the position shown in FIG. 1 towards the lamp 20 until the lamp holder 30 contacts the lamp 20 and moves it slightly downwardly to position the top of the latter in a desired horizontal plane (FIG. 4) for the subsequent threading operation. Thereafter the anvil 24 and the lamp holder 30 remain stationary with respect to the lamp 20, while the orienting jaws continue downwardly until they are positioned below the lower ends of the lead wires 22, as shown in FIG. 7. The orienting jaws 77 and 78 then close around the lamp 20 (FIG. 8) and thereafter move upwardly along the lamp 20 to move the lead wires 22 upwardly over the seal 21 of the lamp 20 (FIG. 9). When the orienting jaws 77 and 78 move upwardly beyond the end of the lamp 20 such jaws then further close around the anvil 24 with the lead wires 22 therebetween with the continued upward movement of the jaws 77 and 78 positioning the lead wires along the anvil 24 (FIG. 10). Thereafter the jaws and anvil 24 are moved upwardly together (FIGS. 11 and 12) to simultaneously straighten, position and set the lead wires 22 by work hardening (while stretching) the latter during the orienting operation.

Figures 2, 3, 6:
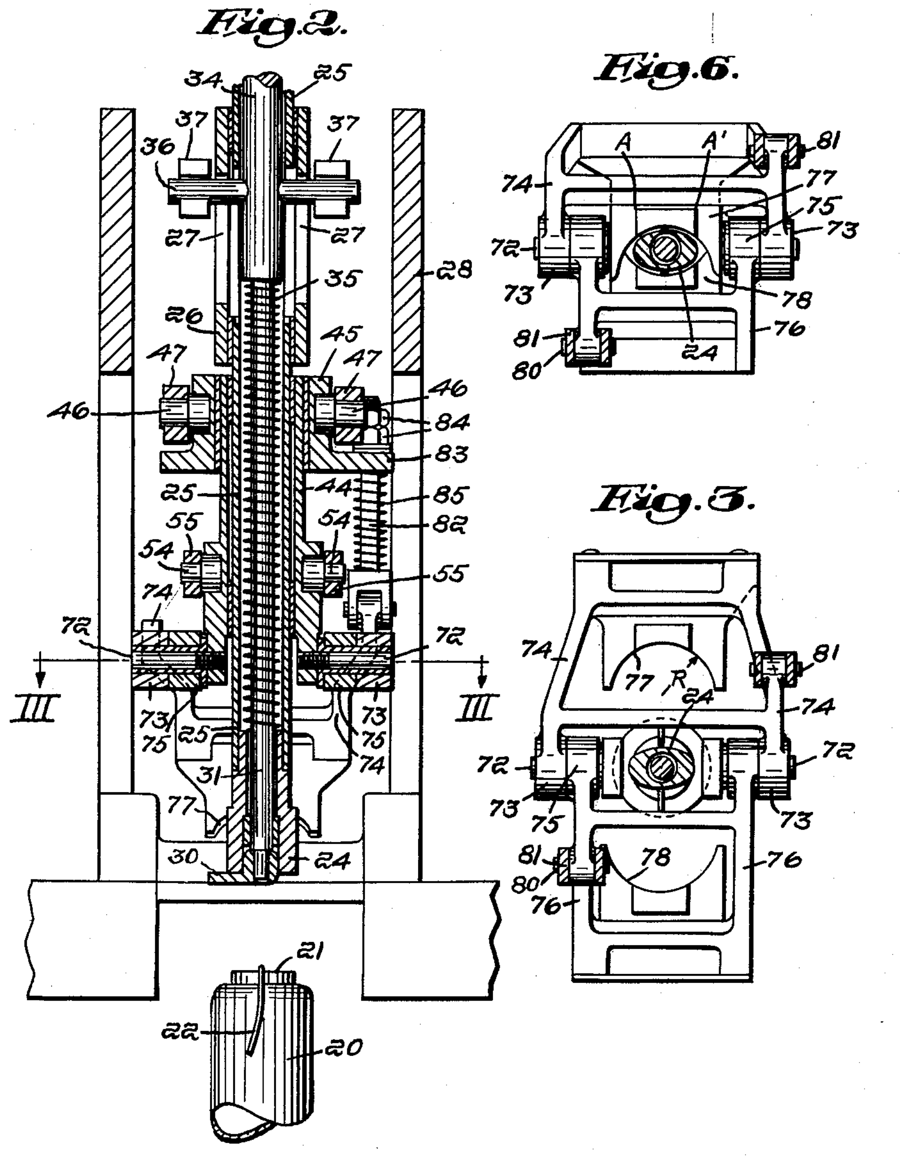
FIG. 2 is a vertical-sectional view along the line II—II of FIG. 1 in the direction of the arrows and showing the details of the lead-wire orienting apparatus.
FIG. 3 is a horizontal-sectional view along the line III—III of FIG. 2 in the direction of the arrows and showing the mounting of the orienting jaws.
FIG. 6 is a horizontal-sectional view along the line VI—VI of FIG. 5 in the direction of the arrows and similar to FIG. 3.

The hollow anvil 24, which is generally elliptical in horizontal section as shown by FIGS. 3 and 6, is disposed along a continuation of the longitudinal axis of the lamp 20. The minor axis of this elliptical shape of the anvil 24 is determined by the distance "*d*" FIG. 12, the desired distance between the oriented lead wires 22. The major axis is such to permit the orienting jaws 77 and 78, having a radius "R," to compress each lead wire 22 against the anvil 24 within the zone A—A' (FIG. 6), when the jaws are in the closed position. To permit vertical reciprocation of the anvil 24 with respect to the frame of the threading conveyor, the anvil is connected at its upper end to a tube 25 which is slidable in a tubular sleeve 26 fixed to the frame of the threading conveyor.

The lead wires 22 extend beyond the seal 21 at diametrically opposite points which lie on an imaginary circle concentric with the seal 21, and the anvil 24 is arranged with respect to the lamp 20 so that a plane extending through the minor axis of the anvil extends through the lead-wire exit points from the plane of the lamp seal.

The lamp holder 30, generally L-shaped in profile (FIGS. 2 and 5), is disposed within the anvil 24. So that a cylindrical upper portion of the lamp holder 30 is slidable in the bottom portion of the anvil 24, such lamp holder 30 is connected to a rod 31, the upper end of which is attached to the bottom of a larger rod 34 having its surface in slidable contact with the inner surface of the tube 25.

*Reciprocating means for lamp holder*

Figures 5, 14, 15, 16:
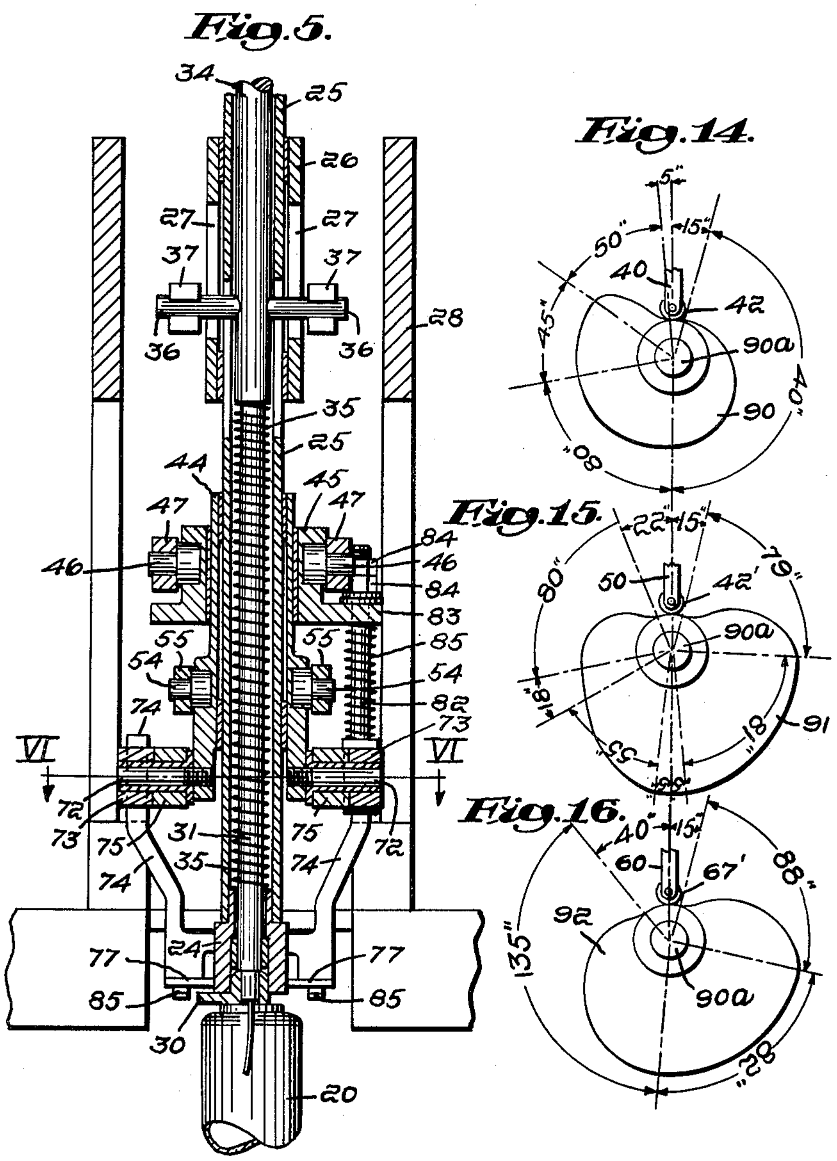
FIG. 5 is a vertical-sectional view along the line V—V of FIG. 4 in the direction of the arrows and similar to FIG. 2.
FIG. 14 is a side view of the cam, cam follower and lower portion of the cam rod of the means used to reciprocate the lamp holder of the lead-wire orienting apparatus.
FIG. 15 is a side view of the cam, cam follower, and lower portion of the cam rod of the operating means used to close and open the orienting jaws of the lead-wire orienting apparatus.
FIG. 16 is a side view of the cam, cam follower and lower portion of the cam rod of the reciprocating means used to raise and lower the orienting jaws.

A reciprocating means for raising and lowering the lamp holder 30 has a pivot rod 36 (FIGS. 1 and 2) extending from the larger rod 34 through aligned vertically extending slots 27 in the tube 25 and the tubular sleeve 26 with the projecting ends of the pivot rod 36 being affixed to forks 37 of a holder-reciprocating lever 38 pivoted at 41 on the frame of the threading conveyor. The holder-reciprocating lever 38 is rotatably attached at its outer end, as viewed in FIG. 1, by a pin 39 to the upper end of a cam rod 40. The cam rod 40, as shown by FIG. 14, carries a cam follower 42 in engagement with a holder-reciprocating cam 90 on a main-drive shaft **90*a* of the threading conveyor. In the conventional manner a spring (not shown) biases the cam follower 42 into engagement with the cam 90 so that the raised portion of such cam 90 raises the rod 40 and the lowered portion of the cam 90 permits the spring (not shown) to lower the rod 40**.

When the pivot rod 36 is moved downwardly, as viewed in FIG. 1, by the inner end of the holder-reciprocating lever 38, it moves the larger rod 34, the rod 31 and the lamp holder 30 attached thereto downwardly, thereby compressing a spring 35 (FIG. 2) disposed about the rod 31 between the larger rod 34 and the anvil 24. This compression of the spring 35 causes downward movement of the anvil 24 together with the lamp holder 30, and such spring 35 keeps the anvil 24 against the lamp holder 30, except when the anvil is raised without the lamp holder being raised (during the straightening and setting operation) as will be described later.

In order to mount the orienting jaws 77 and 78, a bushing 44 (FIGS. 2 and 5) is slidably secured around the tube 25 and the lower end portion of such bushing 44 has pivot rods 72 diametrically extending therefrom to which end portions 73 of jaw forks 74, and end portions 75 of jaw forks 76 are pivotally connected. The jaw forks 74 have the orienting jaw 77 at their lower ends, and the jaw forks 76 have the corresponding orienting jaw 78 at their lower ends.

*Reciprocating means for orienting jaws*

A reciprocating means for the orienting jaws 77 and 78 has diametrically extending pivot rods 54 at an intermediate portion of the bushing 44, to which the inner end portions 55 (FIG. 1 and 4) of a jaw-reciprocating lever 58 are pivotally connected and such lever 58 is rotatably attached at its outer end by a pin 59 to the upper end of a cam rod 60. The lower end of the cam rod 60, as shown by FIG. 16, carries a cam follower 67' engageable with a jaw-reciprocating cam 92 on the main-drive shaft 90*a*. Such cam follower 67' is biased in the conventional manner by a spring (not shown) into engagement with the cam 92 so that the raised portion of such cam 92 elevates the rod 60 and the lowered portion of such cam 92 permits the spring (not shown) to lower the rod 60. The jaw-reciprocating lever 58 is pivoted on the frame at 61 between its ends. In order to provide means for raising the anvil 24 with the orienting jaws after the latter close about the anvil 24, portions 62 (FIGS. 1 and 4) of the jaw-reciprocating lever 58 are attached by nuts 66 to threaded lower ends of vertically extending rods 63 which slide within supports 68 on the frame of the threading conveyor, the tops of such rods 63 being attached by machine screws 64 to a horizontally extending operating plate 65. This operating plate 65 is engageable with a clamp 67 attached to the tube 25 which carries the anvil 24.

When the inner end of the jaw-reciprocating lever 58 is caused to moved downwardly by the jaw-reciprocating cam 92 (FIG. 16), the pivot rods 54 attached to the bushing 44 causes it to move downwardly. This downward movement of the bushing 44 carries with it the diametrically extending pivot rods 72 of the jaw forks 74 and 76 and thereby causes the orienting jaws 76 and 77 affixed thereto to move down. When the inner end of the jaw-operating lever 58 is moved upwardly by a spring (not shown) as permitted by the jaw-reciprocating cam 92, the bushing 44, rods 72 and jaws 77 and 78 are also moved upwardly.

As shown by FIG. 6, the orienting jaws 77 and 78 are so shaped that (when they are closed about the anvil 24) they conform with the elliptical contour of the anvil. These orienting jaws 77 and 78 have bevels 85 and 86 respectively, adjacent their inner ends, which are adapted to ride over the seal 21 on the top of the lamp 20 and prevent the orienting jaws from closing on and damaging such seal when they are moved upwardly in closed position from the position shown in FIG. 9 above the seal to the position shown in FIG. 10.

*Operating mechanism for orienting jaws*

An operating mechanism (FIGS. 1, 3, 4 and 5) for opening and closing the orienting jaws 77 and 78 has the lower ends of rods 82 pivotably connected by pins 80 to upwardly extending ears 81 on the jaw forks 74 and 76. The threaded upper ends of the rods 82 extend through a flange 83 on the bottom of a slide member 45 (which has its inner surface in slidable contact with the outer surface of the cylindrical upper end portion of the bushing 44) and are secured by nuts 84 to the flange 83. Coiled springs 85 extend around the rods 82 between the bottom of the flange 83 and the tops of the ears 81 to cause closure and opening of the orienting jaws 77 and 78, as hereinafter related in detail.

The slide member 45 (FIGS. 1, 2, 4 and 5) has rods 46 diametrically extending therefrom to which the inner end portions 47 of a jaw-operating lever 48 are pivotally connected, and the outer end of such lever 48 is rotatably attached by a pin 49 to the upper end of a cam rod 50. The jaw-operating lever 48 is pivoted at 51 between its ends. The lower end of the cam rod 50 carries a cam follower 42' in engagement with a jaw-operating cam 91, as shown by FIG. 15. Such cam follower 42' is biased by a spring (not shown) into engagement with the cam 91, the raised portion of which elevates the rod 50. The spring (not shown) lowers the rod 50 when the cam follower 42' encounters a lowered portion of the cam 91.

When the inner end of the jaw-operating lever 48 (FIGS. 1 and 4) is caused (by rotation of the jaw-operating cam 91) to move downwardly, it moves the slide member 45 downwardly along the upper portion of the bushing 44, thereby compressing the springs 85 against the ears 81 of the jaw forks 74 and 76 and causing the orienting jaws 77 and 78 to close about their common and now stationary pivot rods 72. When the inner end of the jaw-operating lever 48 is moved upwardly, the flange 83 of the slide member 45 (aided by the springs 85) lifts the rods 82 thus causing the jaw forks 74 and 76 to pivot outwardly about their pivot rods 72 and open the orienting jaws 77 and 78.

The cams 90, 91 and 92 (FIGS. 14, 15 and 16) on the main-drive shaft 90*a* of the threading conveyor are rotated by the same drive means (not shown) for the indexing mechanism of the lamp-carrying turret of the threading conveyor. In the positions shown in FIGS. 14, 15 and 16, the cams and their cam followers are illustrated in positions corresponding to the positions of the anvil 24, the lamp holder 30 and the orienting jaws 77 and 78 shown by FIGS. 4, 5, 6 and 10, where the orienting jaws are closed about the lower portion of the anvil 24 with the lead wires 22 between the orienting jaws and the anvil, preparatory for the straightening and setting operation. The springs for biasing the cam followers 42, 42' and 67' into engagement with their respective cams 90, 91 and 92 and for causing downward movement of the cam rods 40, 50 and 60 are not shown in FIGS. 14–16.

Even though it is believed that the structure and operation of lead-wire orienting apparatus of the present invention will be apparent from the foregoing, nevertheless, for clarity its complete operation will now be described in detail even at the risk of some repetition.

*Operation*

In operation, when a lamp 20 is indexed into the lead-wire orienting station of the threading conveyor (FIGS. 1 and 4), the holder-reciprocating cam 90 (through its cam rod 40, holder-reciprocating lever 38 and lever forks 37) causes the diametrically extending pivot rods 36 to move both rods 34 and 31 and the lamp holder 30 carried by the rod 31 from the position shown in FIG. 1 down against the top of the lamp 20 to the position, shown in FIG. 4. The lamp is frequently a little high as it enters the lead-wire orienting station, and the lamp holder 30 pushes it down slightly to a predetermined level for the subsequent threading operation. The compression of the spring 35 caused by the downward movement of the lamp holder 30 causes the anvil 24 to also move down with the lamp holder, as shown by FIGS. 4 and 5.

The jaw-operating cam 91 and the jaw-reciprocating cam 92 by similar action, cause the cam rods 50 and 60 to move the inner ends of the respective jaw-operating lever 48 and the jaw-reciprocating lever 58 downwardly, which thus causes similar downward movement of the pivot rods 46 and 54 (FIGS. 1 and 4) at the same rate. Such downward movement of the inner end of the jaw-reciprocating lever 58 together with the pivot rods 72 also causes similar movement of the bushing 44 and the orienting jaws 77 and 78 carried thereby. The slide member 45 is simultaneously moved downwardly by the downward movement of the inner end of the jaw-operating lever 48 and carries the jaw-operating springs 85 downwardly. Since the pivot rods 72 on the bushing 44 and the springs 85 on the rods 82 are moving downwardly together, the orienting jaws cannot be closed at this time. After the anvil 24 and the lamp holder 30 have ceased their downward movement (due to the cam 90 having reached its highest point of contact with cam-follower 42), the jaw-reciprocating lever 58 causes the orienting jaws to move down in open position below the lower ends of the wires 22 as shown by FIG. 7.

Figure 13:
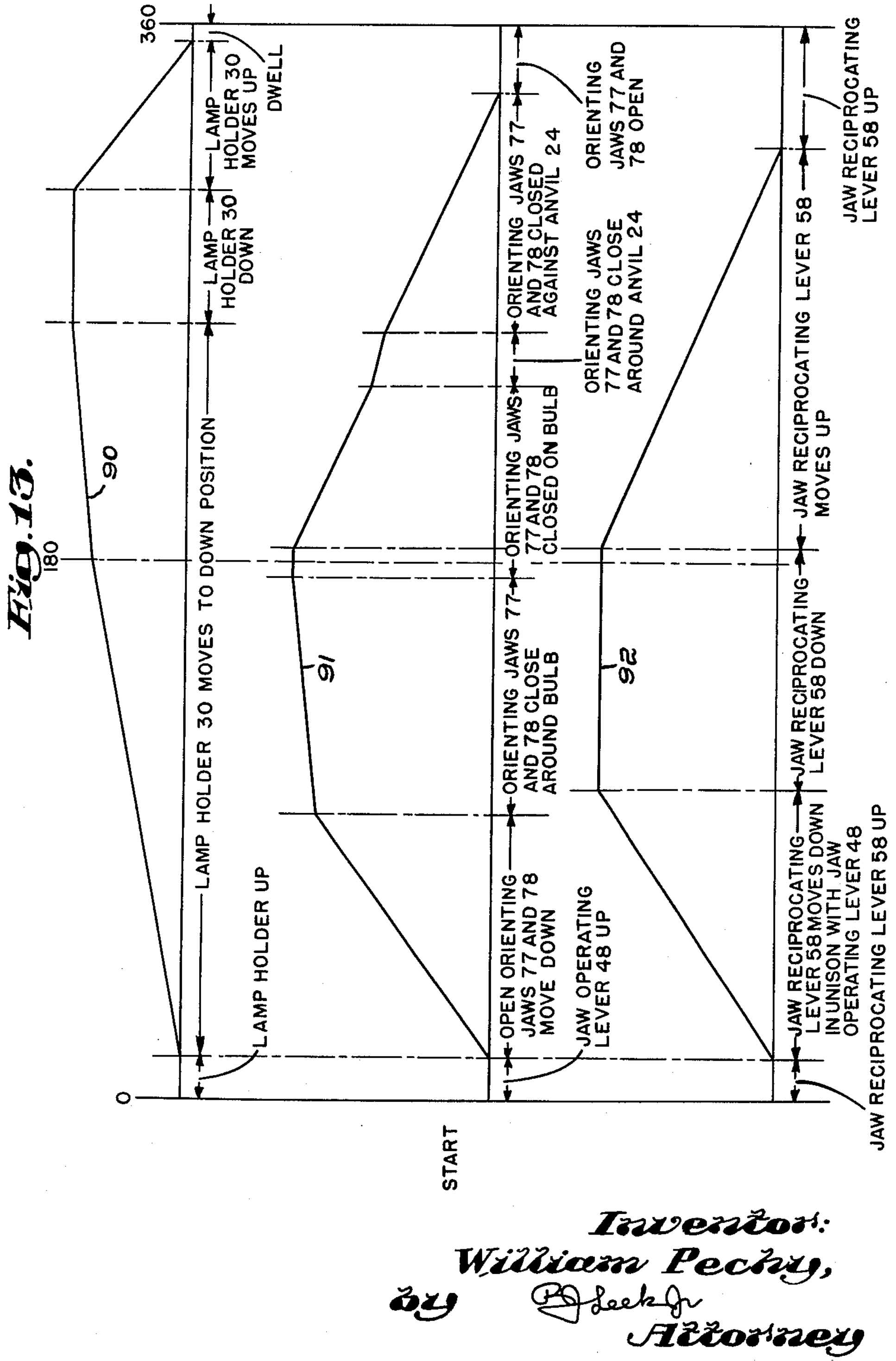
FIG. 13 is a cam chart showing developments of the cams used for automatically operating the lead-wire orienting apparatus.

The jaw-reciprocating lever 58 now stops (FIG. 13) with resultant cessation of the downward movement of the pivot rods 72 of the orienting jaws. However, the jaw-operating cam 91 continues to cause the inner end of the jaw-operating lever 48 to move downwardly, thereby sliding the member 45 downwardly along the bushing 44, and causing (through compression of the springs 85) the jaw forks 74 and 76 to pivot inwardly about their now stationary pivot rods 72 thereby closing the orienting jaws about the lamp 20 at a point below the lower ends of the lead wires 22, as shown by FIG. 8.

Next, the jaw-operating cam 91 and jaw-reciprocating cam 92 cause the inner ends of the associated levers 48 and 58 respectively, to move upwardly to raise the orienting jaws above the top of the lamp 20 and around the lower portion of the anvil 24. During this movement the bevels 85 and 86 on the orienting jaws ride over the seal 21 on the lamp to prevent the orienting jaws from closing about and damaging the seal, and the wires 22 are raised by the orienting jaws above the top of the lamp 20, as shown in FIG. 9.

Then, the jaw-operating cam 91 (FIGS. 13 and 15) causes the inner end of the jaw-operating lever 48 (FIGS. 1 and 4) to move upwardly faster than the jaw-reciprocating cam 92 causes the inner end of the jaw-reciprocating lever 58 to move upwardly, so that the orienting jaws 77 and 78 are closed faster than they are raised. The orienting jaws are then closed about the bottom portion of the anvil 24 with the lead wires 22 between the orienting jaws and anvil 24 and positioned along the latter in the zone A—A′ (FIG. 6) as shown by FIG. 10. As shown in FIG. 6 if the lead wires 22 are outside the zone A—A′, they will not be compressed between the jaws and the anvil.

Further upward movement of the inner end of the jaw-reciprocating lever 58 causes the operating plate 65 (carried by the rods 63) to strike the clamp 67 on the tube 25 thus raising the tube 25 and the anvil 24 attached thereto. The jaw-reciprocating lever 58 then simultaneously moves the orienting jaws and the anvil 24 upwardly (against the action of the spring 35) to cold-work by stretching the lead wires 22 therebetween, the springs 85 providing the required gripping force on the lead wires 22. The lamp 20 is prevented from being moved upwardly by the upward pull on its lead wires 22, by the pressure of the lamp holder 30 on its top. This cold-working of the wires straightens them, hardens them slightly, and positions them on the minor axis of the elliptical anvil 24 or sufficiently close thereto (if gripped within zone A—A′), in the proper positions for a following threading operation at a subsequent work station.

Figure 11:
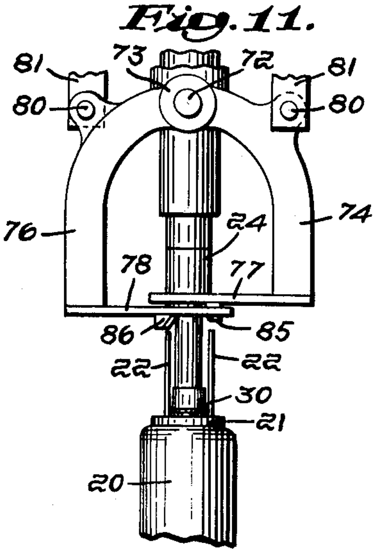
Figure 12:
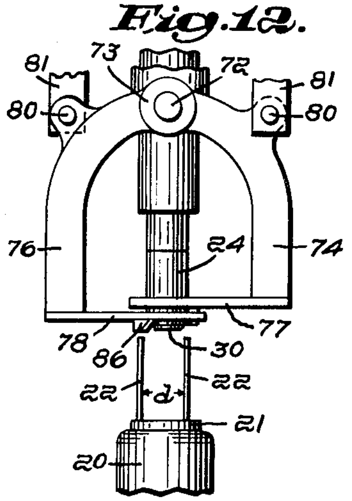

After the orienting jaws 77 and 78 and anvil 24 have moved up above the tops of the lead wires 22, as shown by FIG. 11, the holder-reciprocating cam 90 (FIGS. 13 and 14) permits a spring (not shown) to move the inner end of the holder-reciprocating lever 38 up and causes the rods 34 and 31 to lift the lamp holder 30 up to clear the top of the lamp 20 so that the latter can be indexed by the turret to the threading station, and so that another lamp 20 with lead wires 22 to be oriented can be indexed to the lead-wire orienting station. During this retraction of the lamp holder the jaw-reciprocating cam 92 (FIGS. 13 and 15) stops the upward movement of the inner end of the jaw-reciprocating lever 58 and orienting jaws. The jaw-operating cam 91 however continues to permit a spring (not shown) to raise the inner end of the jaw-operating lever 48, thus causing the orienting jaws to open about their now stationary pivot rods 72.

It will thus be recognized by those skilled in the art that the objects of the present invention have been achieved by the provision of an improved lead-wire orienting apparatus for a conventional threading conveyor. This lead-wire orienting apparatus straightens, positions and sets by stretching the lead wires of an electrical device in a single operation performed at one work station of the threading conveyor. In addition, such apparatus prevents spring-back of the straightened and properly positioned lead wires and eliminates the conventional push-down device on the threading conveyor. Such apparatus also eliminates breakage of the exhaust tubulation during the lead-wire orienting operation.

While in accordance with the patent statutes one best known embodiment of the invention has been illustrated and described in detail, it is to be particularly understood that the invention is not limited thereto or thereby.

I claim:

1. Apparatus for orienting and straightening a pair of lead wires of a supported electrical device having an end, said lead wires extending from said end and being draped along opposite sides of said device away from said end, said apparatus comprising an anvil normally positioned in axial alignment with said device, a first drive means connected to said anvil operable to move said anvil axially into position adjacent said end, mounting means reciprocable on said anvil, a pair of jaws on said mounting means and movable thereon between open and closed position, said jaws being normally disposed in open position adjacent said opposite sides of the device, a second drive means connected to said mounting means for moving said jaws alongside said opposite sides of the device beyond the ends of the lead wires, and operating means connected to said jaws for closing said jaws against said opposite sides of the device beyond said ends of the lead wires, said second drive means being operable then to move said jaws toward and beyond said end of the device thus moving said lead wires beyond said end of the device and alongside said anvil, said operating means being operable thereafter to close said jaws against said anvil with said lead wires between said jaws and said anvil, said first drive means and said second drive means being operable then to simultaneously move said anvil and said jaws away from said end to straighten and cold-work said lead wires between said anvil and said jaws.

2. Apparatus for orienting and straightening a pair of lead wires of a supported electrical device having an end, said lead wires extending from said end and being draped along opposite sides of said device away from said end, said apparatus comprising an anvil normally positioned in axial alignment with said device and having opposite sides corresponding to said opposite sides of the device, which opposite sides of the anvil are spaced closer than said opposite sides of the device, a first drive means connected to said anvil operable to move said anvil axially into position adjacent said end, mounting means reciprocable on said anvil, a pair of jaws on said mounting means and movable thereon between open and closed position, said jaws being normally disposed in open position adjacent said opposite sides of the device, a second drive means connected to said mounting means for moving said jaws alongside said opposite sides of the device beyond the ends of the lead wires, and operating means connected to said jaws for closing said jaws against said opposite sides of the device beyond said ends of the lead wires, said second drive means being operable then to move said jaws toward and beyond said end of the device thus moving said lead wires beyond said end of the device and alongside said opposite sides of the anvil, said operating means being operable thereafter to close said jaws against said opposite sides of the anvil with said lead wires between said jaws and said opposite sides of the anvil, said first drive means and said second drive means being operable then to simultaneously move said anvil and said jaws away from said end to straighten and cold-work said lead wires between said anvil and said jaws.

3. Apparatus for orienting and straightening a pair of lead wires of a supported fluorescent lamp having an end, said lead wires extending from said end and being draped along opposite sides of said lamp away from said end, said apparatus comprising a lamp holder normally positioned in axial alignment with said lamp, an anvil juxtaposed about said holder and in axial alignment therewith, a first operating means connecting said anvil to said holder for causing movement of said anvil with said holder toward said end, a first drive means connected to said holder operable to move said holder into engagement with said end and to cause said anvil to be moved axially into position adjacent said end by said first operating means, mounting means reciprocable on said anvil, a pair of jaws pivoted on said mounting means and normally disposed in open position adjacent said opposite sides of the lamp, a second drive means connected to said mounting means for moving said jaws alongside said opposite sides of the lamp beyond the ends of the lead wires, a second operating means connected to said jaws for closing said jaws against said opposite sides of the lamp beyond said ends of the lead wires, said second drive means being operable then to move said jaws toward and beyond said end thus moving said lead wires beyond said end and alongside said anvil, said second operating means being operable thereafter to close said jaws against said anvil with said lead wires between said jaws and said anvil, stop means carried by said anvil, and coupling means carried by said mounting means and engageable with said stop means, said second drive means being operable then to cause said coupling means to engage said stop means thereby simultaneously moving said anvil and said jaws away from said end and said holder to straighten and cold-work said lead wires between said anvil and said jaws.

4. Apparatus for orienting and straightening a pair of lead wires of a supported fluorescent lamp having an end, said lead wires extending from diametrically opposite spaced points of said end and being draped along opposite sides of said lamp away from said end, said apparatus comprising an anvil normally positioned in axial alignment with said lamp, said anvil being normally spaced from said end and substantially elliptical in section along a plane parallel to the plane of said end, the width of said anvil along the minor axis being substantially the distance between said points with said minor axis and said points defining a plane through the longitudinal axis of said lamp, a first drive means connected to said anvil operable to move said anvil axially into position adjacent said end, mounting means reciprocable on said anvil, a pair of jaws pivoted on said mounting means and in normally disposed open position adjacent said opposite sides of the lamp, a second drive means connected to said mounting means for moving said jaws alongside said opposite sides of the lamp beyond the ends of the lead wires, and operating means connected to said jaws for closing said jaws against said opposite sides of the lamp beyond said ends of the lead wires, said second drive means being operable then to move said jaws toward and beyond said end of the lamp thus moving said lead wires beyond said end of the lamp and alongside said anvil, said operating means being operable thereafter to close said jaws against said anvil with said lead wires between said jaws and said anvil, said first drive means and said second drive means being operable then to simultaneously move said jaws and said anvil away from said end to straighten and cold-work said lead wires between said anvil and said jaws.

5. Apparatus for orienting and straightening a pair of lead wires of a supported fluorescent lamp having an end, said lead wires extending from diametrically opposite spaced points of said end and being draped along opposite sides of said lamp away from said end, said apparatus comprising a lamp holder normally positioned in axial alignment with said lamp, an anvil juxtaposed about said holder and in axial alignment therewith, said anvil being normally spaced from said end and substantially elliptical in section along a plane parallel to the plane of said end, the width of said anvil along the minor axis being substantially the distance between said points with said minor axis and said points defining a plane through the longitudinal axis of said lamp, a first operating means connecting said anvil to said holder for causing movement of said anvil with said holder toward said end, a first drive means connected to said holder operable to move said holder into engagement with said end and to cause said anvil to be moved axially into position adjacent said end by said first operating means, mounting means reciprocable on said anvil, a pair of jaws pivoted on said mounting means and normally disposed in open position adjacent said opposite sides of the lamp, a second drive means connected to said mounting means for moving said jaws alongside said opposite sides of the lamp beyond the ends of the lead wires, a second operating means connected to said jaws for closing said jaws against said opposite sides of the lamp beyond said ends of the lead wires, said second drive means being operable then to move said jaws toward and beyond said end thus moving said lead wires beyond said end and alongside said anvil, said second operating means being operable thereafter to close said jaws against said anvil with said lead wires between said jaws and said anvil, stop means carried by said anvil, and coupling means carried by said mounting means and engageable with said stop means, said second drive means being operable then to cause said coupling means to engage said stop means thereby simultaneously moving said anvil and said jaws away from said end and said holder to straighten and cold-work said lead wires between said anvil and said jaws.

6. Apparatus for orienting and straightening a pair of lead wires of a supported fluorescent lamp having an end, said lead wires extending from said end and being draped along opposite sides of said lamp away from said end, said apparatus comprising a lamp holder normally positioned in axial alignment with said lamp, an anvil juxtaposed about said holder and in axial alignment therewith, a first operating means connecting said anvil to said holder for causing movement of said anvil with said holder toward said end, a first drive means connected to said holder operable to move said holder into engagement with said end and to cause said anvil to be moved axially into position adjacent said end by said first operating means, mounting means reciprocable on said anvil, a pair of jaws pivoted on said mounting means and normally disposed in open position adjacent said opposite sides of the lamp, a second drive means connected to said mounting means for moving said jaws alongside said opposite sides of the lamp beyond the ends of the lead wires, a second operating means connected to said jaws for closing said jaws against said opposite sides of the lamp beyond said ends of the lead wires, said second drive means being operable then to move said jaws toward and beyond said end thus moving said lead wires beyond said end and alongside said anvil, said second operating means being operable thereafter to close said jaws against said anvil with said lead wires between said jaws and said anvil, stop means carried by said anvil, and coupling means carried by said mounting means and engageable with said stop means, said second drive means being operable then to cause said coupling means to engage said stop means thereby simultaneously moving said anvil and said jaws away from said end and said holder to straighten and cold-work said lead wires between said anvil and said jaws, said second operating means being further operable to open said jaws, said first drive means being operable thereafter to retract said holder.

7. Apparatus for orienting and straightening a pair of lead wires of a supported fluorescent lamp having an end, said lead wires extending from diametrically opposite spaced points of said end and being draped along opposite sides of said lamp away from said end, said apparatus comprising a lamp holder normally positioned in axial alignment with said lamp, an anvil juxtaposed about said holder and in axial alignment therewith, said anvil being normally spaced from said end and substantially elliptical in section along a plane parallel to the plane of said end, the width of said anvil along the minor axis being substantially the distance between said points with said minor axis and said points defining a plane through the longitudinal axis of said lamp, a first operating means connecting said anvil to said holder for causing movement of said anvil with said holder toward said end, a first drive means connected to said holder operable to move said holder into engagement with said end and to cause said anvil to be moved axially into position adjacent said end by said first operating means, mounting means reciprocable on said anvil, a pair of jaws pivoted on said mounting means and normally disposed in open position adjacent said opposite sides of the lamp, a second drive means connected to said jaws for moving said jaws alongside said opposite sides of the lamp beyond the ends of the lead wires, a second operating means connected to said jaws for closing said jaws against said opposite sides of the lamp beyond said ends of the lead wires, said second drive means being operable then to move said jaws toward and beyond said end thus moving said lead wires beyond said end and alongside said anvil, said second operating means being operable thereafter to close said jaws against said anvil with said lead wires between said jaws and said anvil, stop means carried by said anvil, and coupling means carried by said mounting means and engageable with said stop means, said second drive means being operable then to cause said coupling means to engage said stop means thereby simultaneously moving said jaws and said anvil away from said end and said holder to straighten and cold-work said lead wires between said anvil and said jaws, said second operating means being further operable to open said jaws, said first drive means being operable thereafter to retract said holder.

References Cited in the file of this patent

UNITED STATES PATENTS

| | | |
|---|---|---|
| 1,760,507 | Loebe | May 27, 1930 |
| 1,760,629 | Brindle | May 27, 1930 |
| 1,853,947 | Van Der Poel | Apr. 12, 1932 |
| 2,565,126 | Flaws | Aug. 21, 1951 |
| 2,720,690 | Mullan | Oct. 18, 1955 |
| 2,721,373 | Midgley | Oct. 25, 1955 |
| 2,765,002 | Reynolds | Oct. 2, 1956 |
| 2,878,841 | Peterson | Mar. 24, 1959 |